US011329955B2

(12) United States Patent
Soman (10) Patent No.: US 11,329,955 B2
(45) Date of Patent: May 10, 2022

(54) REMOTE SESSION BASED MICRO-SEGMENTATION (71) Applicant: VMware, Inc., Palo Alto, CA (US)

(72) Inventor: Sisimon Soman, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 524 days.

(21) Appl. No.: 15/879,150

(22) Filed: Jan. 24, 2018

(65) Prior Publication Data

US 2019/0230064 A1 Jul. 25, 2019

(51) Int. Cl.
G06F 17/00 (2019.01)
H04L 29/06 (2006.01)
H04L 67/141 (2022.01)
H04L 47/20 (2022.01)
G06F 9/455 (2018.01)
G06F 8/65 (2018.01)
H04L 67/146 (2022.01)

(52) U.S. Cl.
CPC .......... H04L 63/0263 (2013.01); G06F 8/65 (2013.01); G06F 9/45558 (2013.01); H04L 47/20 (2013.01); H04L 63/0236 (2013.01); H04L 63/20 (2013.01); H04L 67/141 (2013.01); G06F 2009/45579 (2013.01); G06F 2009/45583 (2013.01); G06F 2009/45595 (2013.01); H04L 67/146 (2013.01)

(58) Field of Classification Search
CPC ... H04L 63/0263; H04L 47/20; H04L 67/141; H04L 63/20; H04L 63/0236; H04L 67/146; G06F 9/45558; G06F 8/65; G06F 2009/45579; G06F 2009/45583; G06F 2009/45595

See application file for complete search history.

(56) References Cited

U.S. PATENT DOCUMENTS

| | | | | |
|---|---|---|---|---|
| 7,849,502 B1* | 12/2010 | Bloch | .................... | H04L 63/168 726/11 |
| 10,846,117 B1* | 11/2020 | Steinberg | ................ | G06F 9/544 |
| 2009/0279547 A1* | 11/2009 | Mistry | .................... | H04L 47/24 370/392 |
| 2012/0011284 A1* | 1/2012 | Filali-Adib | ........... | G06F 9/5016 710/8 |
| 2012/0317566 A1* | 12/2012 | Santos | .................. | H04L 45/742 718/1 |
| 2015/0199513 A1* | 7/2015 | Ismael | .................. | G06F 21/552 726/22 |

(Continued)

OTHER PUBLICATIONS

"Ritu Maheshwari, Anil Rajput, Anil Kumar Gupta, Private Virtual Cloud Infrastructure Modelling using "VCPHCF-RTT" SEcurity Agent, Dec. 14-15, 2018, IEEEXplore, INSPEC#18868600" (Year: 2018).*

(Continued)

Primary Examiner — Phy Anh T Vu
(74) Attorney, Agent, or Firm — Thomas | Horstemeyer LLP (57) ABSTRACT The disclosure provides an approach for implementing a distributed firewall within a data center. The firewall is implemented as a kernel space filter driver within the operating system of virtual machines. Each virtual machine hosts several user sessions. The firewall may be dynamically updated with new security policies, either by an administrator or a component of the data center.

21 Claims, 6 Drawing Sheets (56) References Cited

U.S. PATENT DOCUMENTS

| | | | |
|---|---|---|---|
| 2015/0358288 A1* | 12/2015 | Jain | H04L 63/0254 |
| | | | 726/13 |
| 2016/0110211 A1* | 4/2016 | Karnes | H04L 43/12 |
| | | | 718/1 |
| 2016/0380848 A1* | 12/2016 | Raney | H04L 67/32 |
| | | | 709/213 |
| 2017/0118102 A1* | 4/2017 | Majumder | H04L 43/0894 |
| 2017/0171159 A1* | 6/2017 | Kumar | H04L 63/0281 |
| 2018/0115586 A1* | 4/2018 | Chou | G06F 8/656 |
| 2018/0123907 A1* | 5/2018 | Raman | H04L 47/828 |
| 2020/0073694 A1* | 3/2020 | Wallach | G06F 9/45558 |

OTHER PUBLICATIONS

"Mahwish Anwar, Virtual Firewalling for migrating virtual machines in cloud computing, Dec. 14-15, 2013, IEEE Xplore, INSPEC #14080059" (Year: 2013).*

U.S. Appl. No. 15/713,702, filed Sep. 25, 2017 and entitled "Application Assessment and Visibility for Micro-Segmentation of a Network Deployment."

U.S. Appl. No. 15/708,352, filed Sep. 19, 2017 and entitled "Attribute Enhancement for Handling Network Packet Traffic Between Micro Segmented Guests."

* cited by examiner

REMOTE SESSION BASED MICRO-SEGMENTATION

BACKGROUND

Data centers or cloud environments have traditionally been secured by emphasizing perimeter protection to keep outside threats from affecting the entities within the network. Security services such as firewalls were provided at the perimeter to monitor the traffic exchanged with the outside environment and detect the outside threats.

In a multi-tenant environment, different host machines host virtual machines (VMs) for different users (or tenants). As used herein, the term "tenants" may refer to departments within the same or different company, to separate companies, to individuals with differing permissions, or to any entity whose access permissions differ from other entities. In some cases, several logically separated VMs of different tenants operate on a single host. In such shared environments, security services (as well as other services) must be applied within the data center, not only against external threats, but also from threats of other machines within the data center or other VMs running on the same host. In some such cases, the services are distributed and enforced throughout the network. For example, a distributed firewall provides firewall services with multiple enforcement points throughout the network to enable security for traffic within the multi-tenant environment.

Micro-segmentation divides a physical network into logical sub-networks to prevent communication across unrelated entities, to establish security around individual or groups of related workloads, and to provide distributed services, such as a distributed firewall, that are tailored to each individual tenant's requirements.

In past approaches, network security policies were applied on a per-VM basis by a distributed firewall, typically located within a hypervisor of a host. That is, a single user was assigned to a VM running within the data center, and the user's permissions were synonymous with the VM's permissions. For example, network packets originating from the IP address of the user's VM were analyzed by a firewall within the hypervisor, and if the user was not allowed to access the destination of the packet, then the packet was blocked by the hypervisor. One of the advantages of this approach is that it reduced network traffic by stopping packets before they left the host.

However, a one-VM-per-user approach limits the number of users per host. A VM needs a host to allocate certain minimal resources to the VM, such as to satisfy minimal memory requirements. A host might allocate all its available resources to VMs and not be able to host more users. At the same time, the users assigned to the VMs might be using a small portion of those resources. This results in an inefficient use and allocation of computing resources.

SUMMARY

Embodiments provide a method of filtering network packets. The method comprising creating a first user session and a second user session, and setting a first security policy pertaining to the first user session, and a second security policy pertaining to the second user session. The method further comprises receiving a network packet, by a filter driver, the network packet (a) originating from the first user session or destined for the first user session or (b) originating from the second user session or destined for the second user session, wherein the filter driver is located within kernel space of a virtual machine. If the network packet originated from the first user session or is destined for the first user sessions, the filter driver compares packet attributes of the network packet to the first security policy, and if the network packet originated from the second user session or is destined for the second user session, the filter driver compares packet attributes of the network packet to the second security policy. Responsive to the comparing, the filter driver either blocks the network packet or transmits the network packet to its destination.

Further embodiments include a non-transitory computer-readable storage medium storing instructions that, when executed by a computing system, cause the computing device to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure teaches a system and method of implementing a distributed firewall within a data center, the distributed firewall being located within each virtual machine of the data center. Each virtual machine of the data center is capable of hosting a plurality of user sessions. The firewall is capable of being dynamically updated with new security policies in real time.

Figure 1A:
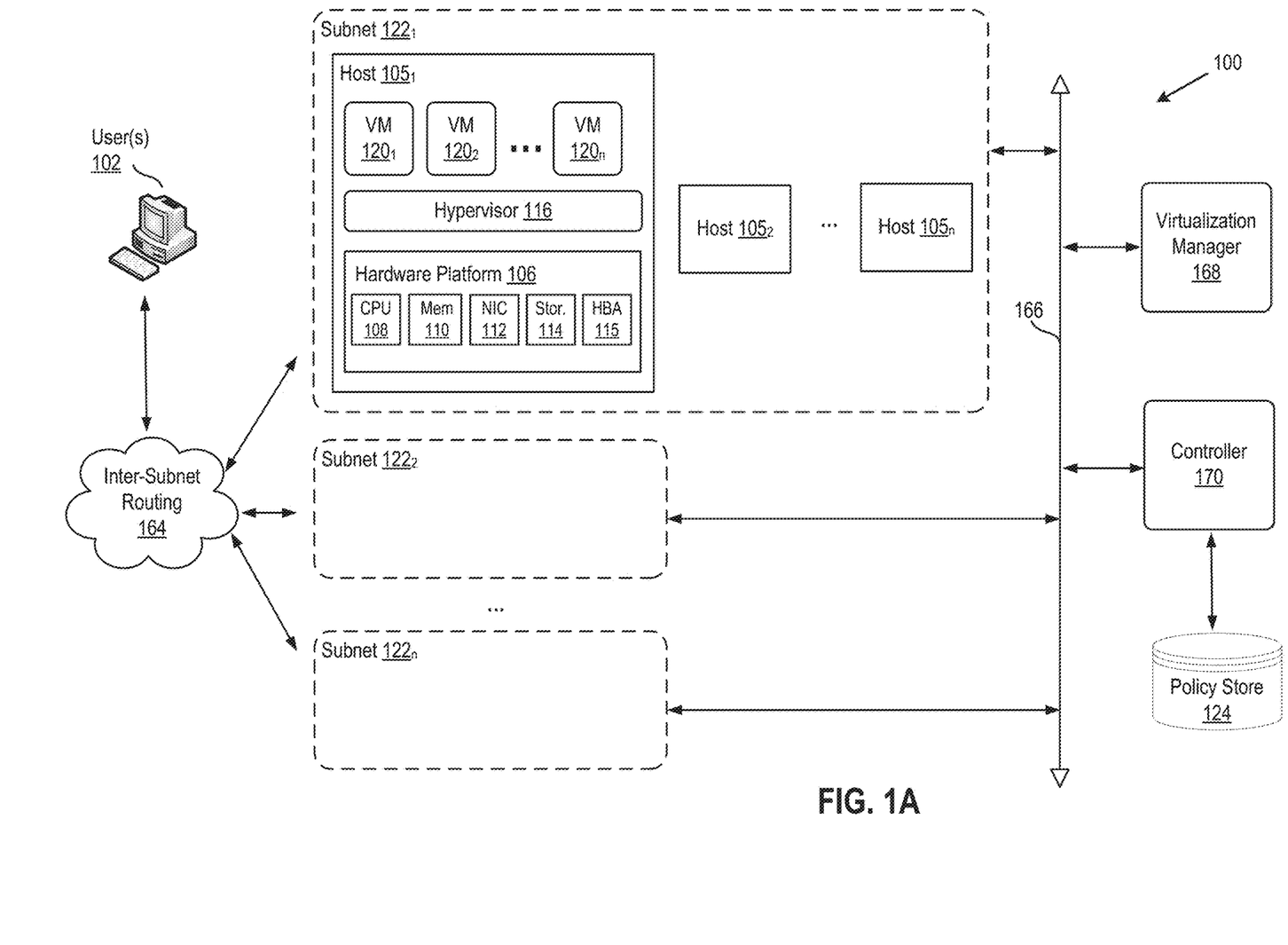
FIG. 1A depicts a block diagram of a data center, in which one or more embodiments of the present disclosure may be utilized.

FIG. 1A depicts a block diagram of a data center 100, in which one or more embodiments of the present disclosure may be utilized. Data center 100 is divided into one or more subnets 1221-122n (collectively referred to as subnets 122 and individually referred to as subnet 122). A subnet may be defined as a logical subdivision of an IP network, such that the nodes within the subdivision do not need to communicate through a router. In some embodiments, a subnet may be a VLAN (Virtual Local Area Network) or an IP subnet inside a VLAN. In some embodiments, a VLAN contains only one IP subnet. In some embodiments, multiple IP subnets are allocated in a VLAN. In some embodiments, a network subnet includes a set of adjacent VLANs that have high bandwidth and/or low cost links between each other.

Subnets 122 of data center 100 include hosts 105₁-105ₙ (collectively referred to as hosts 105 and individually referred to as host 105). Host 105 may be constructed on a server grade hardware platform 106, such as an x86 architecture platform. Hardware platform 106 of host 105 includes one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein. The instruction may be stored in memory 110 and/or in local storage 114. Memory 110 is a device allowing information, such as executable instructions, cryptographic keys, virtual disks, configurations, and other data, to be stored and retrieved. Memory 110 is where programs and data are kept when the processor is actively using them. Memory 110 may be a byte-addressable, random access memory, and memory 110 may include, for example, one or more random access memory (RAM) modules. Network interface 112 enables host 105 to communicate with another device via a communication medium, such network of subnet 122 containing host 105, or via inter-subnet routing 164. Network interface 112 may be one or more network adapters, also sometimes referred to as Network Interface Cards (NICs). Storage system 114 represents persistent one or more storage devices (e.g., one or more hard disks, flash memory modules, solid state disks, and optical disks) in host 105.

Host 105 is configured to provide a virtualization layer that abstracts processor, memory, storage, and networking resources of hardware platform 106 into multiple virtual machines 120₁ to 120ₙ (collectively referred to as VMs 120 and individually referred to as VM 120) that run concurrently on the same host. VMs 120 run on top of a software interface layer, referred to herein as a hypervisor 116, that enables sharing of the hardware resources of host 105 by VMs 120. Although certain embodiments are described herein with respect to VMs, the same principals and techniques may also apply to other appropriate virtual computing instances (e.g., containers (e.g., Docker containers), data compute nodes, isolated user space instances, namespace containers, etc.). One example of a hypervisor 116 that may be used is a VMware ESXi™ hypervisor provided as part of the VMware vSphere® solution made commercially available from VMware, Inc. of Palo Alto, Calif. Hypervisor 116 may run on top of the operating system of host 105 or directly on hardware platform 106 of host 105. The OS of host 105 may have Remote Desktop Session Host (RDSH) software installed, so as to interact with RDS client installed on the device of user 102. RDSH is a software service on the Windows® operating system, commercially available from Microsoft Corp.

Data center 100 includes an implementation of a logical VM network that connects VMs 120 over the physical network of data center 100. The logical VM network is for data communication among VMs 120. The logical VM network is a software defined network (SDN) that is an overlay network implemented on a physical network of data center 100. An example of a logical network is a Virtual Extensible Local Area Network (VXLAN).

Figure 1B:
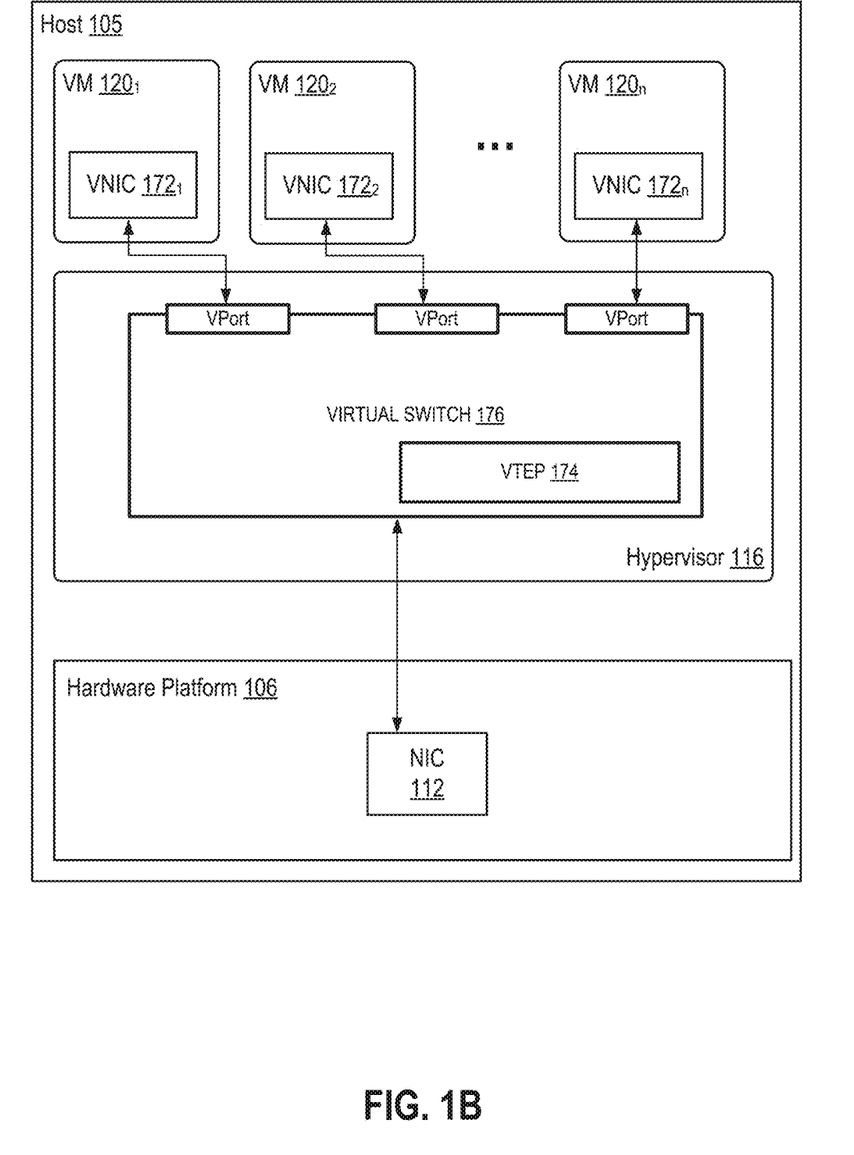
FIG. 1B depicts a block diagram showing details of a hypervisor that supports an SDN overlay network for VMs 120, according to an embodiment.

FIG. 1B depicts a block diagram showing details of hypervisor 116 that supports an SDN overlay network for VMs 120, according to an embodiment. Host 105 is configured to provide a virtualization layer that abstracts processor, memory, storage, and networking resources of hardware platform 106 into VMs 120. Hypervisor 116 may include a virtual switch 176, which serves as an interface between the hosted virtual machines 120, NIC 112, as well as other physical resources available on host 105. Hypervisor 116 further includes a hypervisor-based Virtual Extensible Local Area Network (VXLAN) tunnel endpoint (VTEP) 174 which may be implemented in software by virtual switch 176 (or outside of virtual switch 176 and functionally coupled to virtual switch 176 using forwarding tables). Accordingly, VTEP 174 is responsible for providing VTEP services for each of the VMs 120 on the same host machine 105 as VTEP 174.

Each of the virtual machines 120 may include a virtual network interface card (VNIC) 134, which is responsible for exchanging packets between the virtual machine 120 and hypervisor 116. VNICs 134 may be, in some cases, a software abstraction of a physical network interface card. Each virtual machine 120 is connected to a virtual port (vport) provided by virtual switch 176, and virtual switch 176 is connected to physical network interface 112 to allow network traffic to be exchanged between virtual machines 120 executing on host machine 105 and other network destinations such as virtual machines hosted by other host machines.

The logical VM network is implemented by encapsulating data packets that are generated by VMs 120 for delivery through the underlying physical network. The original packet generated by a source virtual machine is an inner packet. The encapsulated packet generated by the host, such as through VXLAN encapsulation, may be referred to as an outer packet. For example, VM 12 may generate a packet and send the generated packet to virtual switch 176 implemented in hypervisor 116. Having received the packet, virtual switch 176 then utilizes VTEP 174 to encapsulate the packet received from VM 120 to generate an encapsulated packet that is then sent over the physical network of data center 100 to a target host or other physical endpoint.

Returning to FIG. 1A, data center 100 includes a controller 170 that collects and distributes information about data center 100 from and to components of data center 100. Controller 170 collects, stores, and/or distributes security policy information about user(s) 102. Controller 170 stores user security policies within policy store 124, which is a storage medium such as a storage array. In an embodiment, controller 170 may be an NSX Controller, which is a component of VMware NSX™, commercially available from VMware, Inc. of Palo Alto, Calif.

A security policy within policy store 124 may include per-user access privileges and limitations. Exemplary privileges and limitations that may be contained within a security policy include indications as to whether a user may or may not access a certain application, may or may not access files located on a given server, or may or may not access files within a given time window. In some embodiments, controller 170 receives and distributes security policy information through the physical infrastructure provided by data center 100. Controller 170 may communicate with hosts 105 via management network 166. In some embodiments, controller 170 is a central controller for all subnets of data center 100. Security policies may be obtained from existing micro-segmentation services, such as VMware NSX™ made commercially available from VMware, Inc. of Palo Alto, Calif. Security policies may also be created, such as by the method of creating security policies described in U.S. patent application Ser. No. 15/713,702 filed Sep. 25, 2017 and entitled "Application Assessment and Visibility for Micro-Segmentation of a Network Deployment," which is incorporated by reference herein in its entirety.

Security policies may be enforced by analyzing packet attributes and comparing the attributes to the policies. For example, the source and destination packet attributes may be compared to the security policy of user 102 sending the packet to determine whether user 102 may send the packet to the packet's destination. As discussed below with reference to FIG. 2, policies may be enforced by a distributed firewall with VMs 120, implemented as a filter driver 202. For further information on using packet attributes to enforce security policies, see U.S. patent application Ser. No. 15/708,352 filed Sep. 19, 2017 and entitled "Attribute Enhancement for Handling Network Packet Traffic Between Micro Segmented Guests," which is incorporated by reference herein in its entirety.

Data center 100 includes inter-subnet routing 164, which is a set of network components that provide communication pathways among subnets 122. In an embodiment, inter-subnet routing 164 includes at least one router (not shown). Data traffic between the subnets 122 flows through inter-subnet routing 164, and in an embodiment, inter-subnet routing 164 comprises the "data path" of data center 100 while network 166 comprises the "control path" of data center 100. In some embodiments, network traffic that takes place within each subnet cannot be directly routed across inter-subnet routing 164, or cannot be routed over without incurring additional cost in terms of time, bandwidth, or computing power.

Data center 100 includes a management component, depicted in FIG. 1A as virtualization manager 168, that may communicate to hosts 105 via a network 166, sometimes referred to as a management network. In one embodiment, virtualization manager 168 is a computer program that executes in a central server in data center 100, or alternatively, virtualization manager 168 may run in a VM, e.g. in one of hosts 105. One example of a virtualization manager is the vCenter Server™ product available from VMware, Inc. Virtualization manager 168 is configured to carry out administrative tasks for data center 100, including managing hosts 105, managing VMs 120, provisioning VMs, transferring VMs from one host to another host, transferring VMs from data center 100 to another network or data center (not shown), and load balancing between hosts 105, and between data center 100 and other networks. An example of a tool that may be used to perform a VM transfer between hosts is VMware VMotion™, which is commercially available from VMware, Inc. of Palo Alto, Calif.

User(s) 102 may be a component of data center 100 or may be external to data center 100. A user 102 may log in to data center 100 through a router within inter-subnet routing 164, or user 102 may log directly into one of hosts 105 without connecting through a router. User 102 may be an entity identifiable by an ID and password pair. The entity may be, for example, an individual or a company. User 102 may log into data center 100 through a network, such as a local area network (LAN), a wide area network (WAN) (e.g., Internet), or through a direct link. User 102 may log into data center 100 through a device such as a desktop or mobile computer.

In an embodiment, user 102 may have a Remote Desktop Services (RDS) client installed on the device used to connect to data center 100. RDS client may interact with RDSH services installed on host 105 and/or VM 120. RDS is available from available from Microsoft Corp. as part of the Windows® operating system. User 102 may connect to data center 100 using a commercial product for remote desktop virtualization, such as Horizon View™, commercially available from VMware, Inc. of Palo Alto, Calif. User 102 may also connect to data center 100 using Remote Desktop Connection, available from Microsoft Corp. as part of the Windows® operating system, or by using RemoteApp, which is available from Microsoft Corp. User 102 may communicate with data center 100 using a protocol such as Remote Desktop Protocol (RDP), developed by Microsoft Corp.

Figure 2:
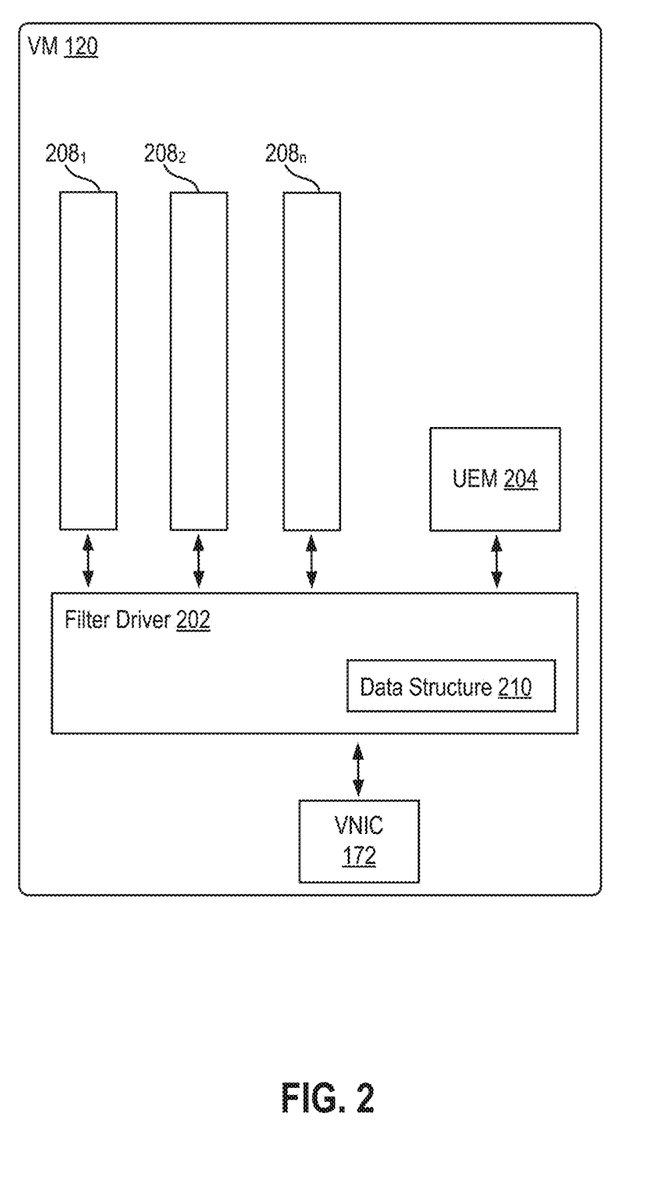
FIG. 2 depicts a block diagram showing details of a virtual machine that support a firewall to enforce user-specific security policies, according to an embodiment.

FIG. 2 depicts a block diagram showing details of VM 120, the VM supporting a firewall that enforces user-specific security policies, according to an embodiment. When user 102 logs in to data center 100, virtualization manager 168 assigns user 102 to a VM 120, which serves to process interaction between user 102 and data center 100. Upon user log on and user 102 being assigned to VM 120, the operating system of VM 120 creates a user session 208 for user 102. User session 208 may be associated with or may be an ID assigned to user 102 within kernel space of the OS of VM 120 to refer to the session of user 102 within VM 120. The OS of VM 120 may have RDSH software installed, so as to interact with RDS client installed on the device of user 102. In an embodiment, an ID for user session 208 may be created by the RDSH software.

In some embodiments, Windows Containers, such as Windows Core Containers, available as part of the Windows® operating system from Microsoft Corp, may be deployed on top of user sessions 208. Windows Containers utilize a user session 208 as a way to hook into the Windows session of a user.

User 102 may not be the only user assigned to VM 120 by virtualization manager 168. VM 120 may contain multiple simultaneous user sessions $208_1$ to $208_n$ (collectively referred to as user sessions 208 and individually referred to as user session 208). Assigning multiple users to VM 120 allows for a flexible and efficient use of resources of host 105. VM 120 requires a certain minimum allocation of resources of host 105, but user 102 may not utilize all the allocated resources. Multiple users 102 may be able to share the minimal resources allocated to VM 120 by host 105. If additional resources are needed by VM 120 to service its users 102, then more resources may be allocated as needed.

VM 120 includes user environment manager (UEM) 204. Upon creation of user session 208, UEM retrieves all configuration settings for user 102 from a configuration repository (not shown) and configures user session 208 as per the configuration settings. For example, UEM 204 may configure user session 208 with a certain default font, desktop background image, custom email signature, desktop icons, etc. UEM also retrieves security policies specific to user 102 and stores them within data structure 210 (i.e., within a portion of memory 110 allocated to VM 120). Data structure 210 maps ID of user session 208 to security policies of user 102. Data structure 210 is accessible by filter driver 202. In an embodiment, data structure 210 is maintained and managed by filter driver 202, and data structure 210 is located within a portion of memory 110 allocated to VM 120.

Filter driver 202 uses the security policies mapped in data structure 210 to implement a firewall between user session 208 and the network outside of VM 120. Filter driver 202 is a software service located in the kernel space of VM 120. Filter driver 202 loads upon loading of the operating system running on VM 120. Filter driver 202 intercepts all communication from and to user sessions 208. Filter driver 202 analyzes packets generated by VM 120 and that are received by VM 120. The packets that are generated by VM 120 may be generated on behalf of user sessions 208. Filter driver 202 analyzes attributes of packets generated by session 208 and compares them to policies stored within data structure 210. If the packet generated by user session 208 violates the security policy of user 102 associated with user session 208, then the packet is blocked. If the packet does not violate any security policies, then the packet is allowed to continue into the network outside of VM 120. Similarly, filter driver 202 analyzes packets received by VM 120, determines which of sessions 208 is the receiver of the packet, and if the received packet violates the security policy for session 208, then filter driver 202 blocks the packet. If the received packet does not violate any security policy of sessions 208, then filter driver 202 allows the received packet to continue to its destined user session 208.

In an embodiment, filter driver 202 is a Windows Filtering Platform (WFP) driver that uses the Application Layer Enforcement (ALE) feature of WFP to hook into ID's of user sessions 208. Filter driver 202 may then enforce security policies based on session IDs, mapped into data structure 210. When implemented as a WFP filter, filter driver 202 may also hook into application-specific handles and/or object files to filter packets destined to or from an application.

Figure 3:
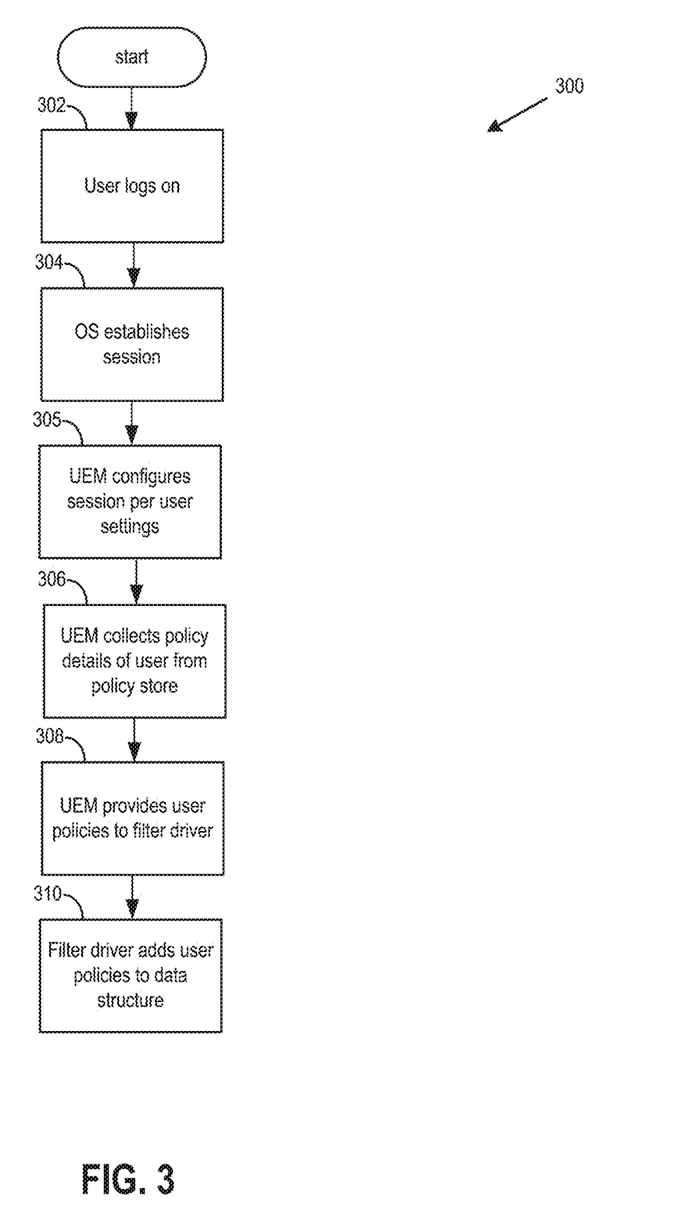
FIG. 3 depicts a flow diagram of a method of configuring a filter driver as a firewall for a new user session within a virtual machine, according to an embodiment.

FIG. 3 depicts a flow diagram of a method 300 of configuring filter driver 202 as a firewall for a new user session 208 within VM 120, according to an embodiment. At step 302, user 102 logs in to data center 100. User 102 may be logging in to data center 100 through a LAN, a WAN, or other network, and user 102 may be external to data center 100 or may be within data center 100. When user logs on, virtualization manager 168 assigns user 102 to a VM within host 105. At the time user 102 logs in to data center 100, other users (not shown) may also be logged in to data center 100.

At step 304, the operating system of VM 120 establishes user session $208_1$ for user 102, and creates an ID for user session $208_1$. At the time of establishment of user session $208_1$, other user sessions (e.g., $208_2$ to $208_n$) may be running within VM 120. In an embodiment, the operating system of VM 120 may also create a container object instance (not shown) to operate in conjunction with user session $208_1$. The container object may run on top of user session $208_1$.

At step 305, UEM 204 configures user session $208_1$ to customize and personalize it for user 102, as per user-specific settings. For example, UEM 204 may customize the desktop background image and icons as per settings of user 102.

At step 306, UEM 204 contacts controller 170 and requests security policies pertaining to user 102. Controller 170 retrieves the security policies applicable to user 102 from policy store 124 and provides the security policies to UEM 204.

At step 308, UEM 204 provides the security policies pertaining to user 102 to filter driver 202. At step 310, filter driver 202 accesses data structure 210 to create a mapping of the ID of user session $208_1$ (pertaining to user 102) to the retrieved security policies. At the time of the mapping, data structure 210 may already contain mappings for other user sessions (e.g., $208_2$ to $208_n$) that may be running on VM 120 simultaneously with user session $208_1$. The ID of user session $208_1$ is unique from IDs of any of other user sessions that may be running on VM 120. Each user session 208 running on VM 120 has a unique ID. At this point, filter driver 202 is ready to act as a firewall between user session $208_1$ and the network of data center 100 external to VM 120.

Figure 4:
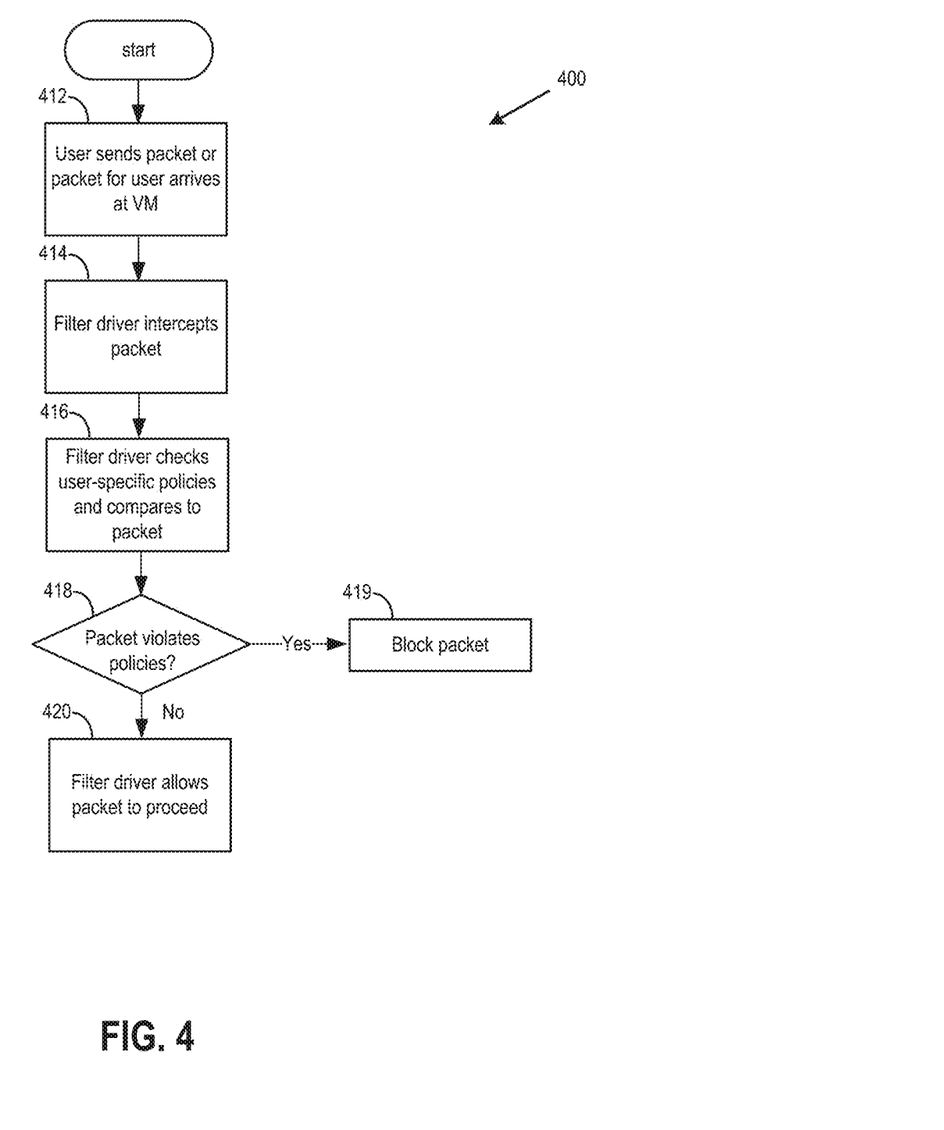
FIG. 4 depicts a block diagram of a method of enforcing user-specific security policies by a filter driver, according to an embodiment.

FIG. 4 depicts a block diagram of a method 400 of enforcing user-specific security policies by filter driver 202, according to an embodiment. Method 400 occurs after completion of method 300 of FIG. 3. Method 400 may occur in parallel with method 500 of FIG. 5.

At step 412 of method 400, user session $208_1$ generates a network packet and attempts to send the packet. The packet may be, for example, in order to establish a connection to a server or application within data center 100. Alternatively or in addition, step 412 may also include the receiving of a network packet by VM 120 to be forwarded to user session $208_1$.

At step 414, filter driver 202 intercepts the network packet, whether the packet was generated by an application running in user session $208_1$, or received by VM 120 and destined for user session $208_1$. At step 416, filter driver 202 accesses data structure 210 to access security policies specific to user session $208_1$. Filter driver 202 also analyzes the packet for attributes relevant for comparing the packet to the user-specific security policies.

At step 418, filter driver 202 determines whether the network packet violates security policies that pertain to user session $208_1$ of user 102. If the network packet violates the security policies, then filter driver 202 blocks the packet at step 419. If the blocked network packet was generated by an application running in user session $208_1$, then the packet does not leave VM 120. If the blocked network packet was received by VM 120 for user session $208_1$, then the packet does not reach user session $208_1$.

If filter driver 202 determines that the network packet does not violate any security policies, then at step 420, filter driver 202 forwards the network packet to its destination. If the allowed network packet was generated by an application running in user session $208_1$, then the packet leaves VM 120 through VNIC 172. If the blocked network packet was received by VM 120 for an application running in user session $208_1$, then filter driver 202 transmits the network packet to user session $208_1$.

Figure 5:
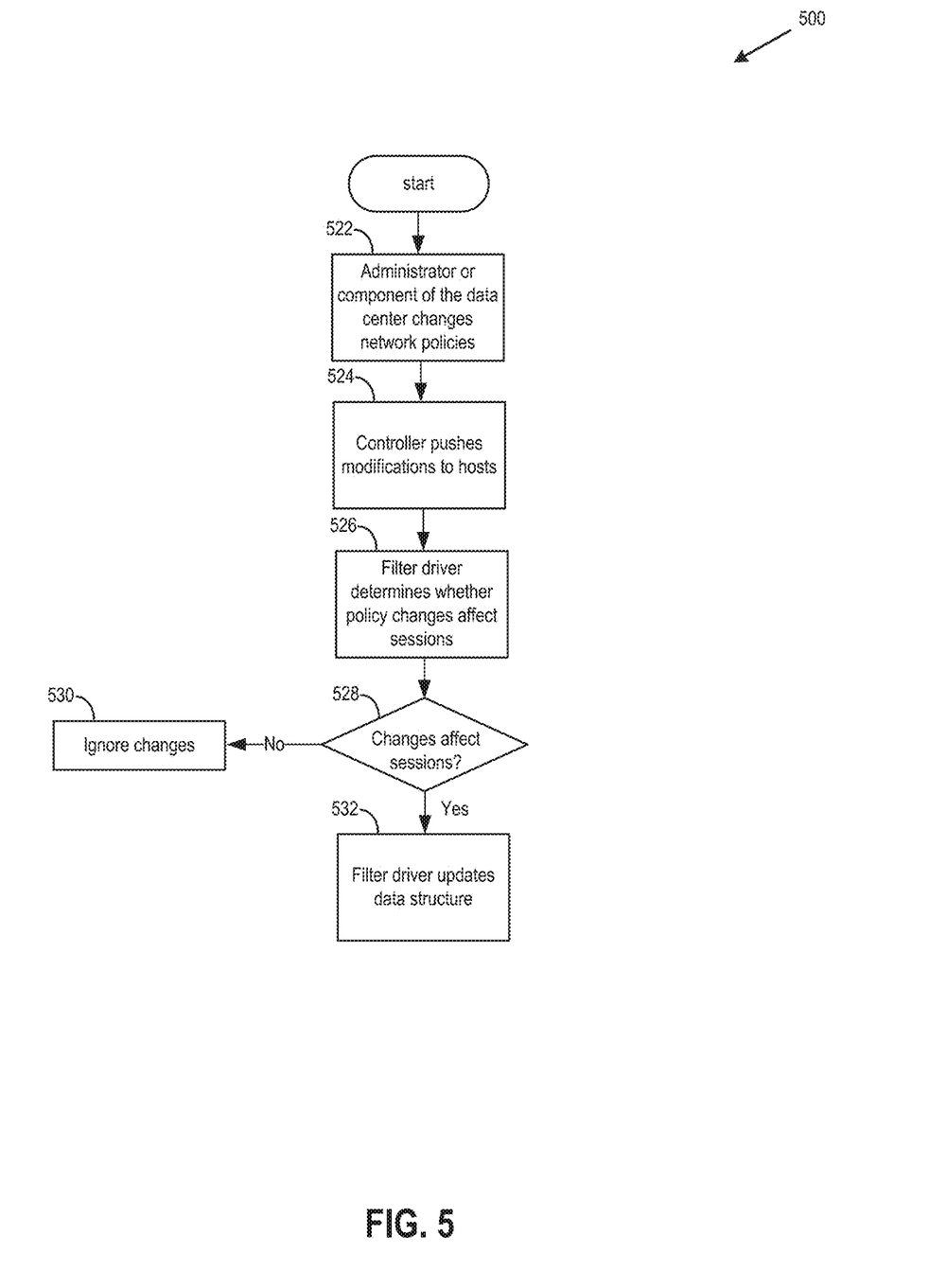
FIG. 5 depicts a block diagram of a method of dynamically changing user-specific security policies within a distributed firewall, according to an embodiment.

FIG. 5 depicts a block diagram of a method 500 of dynamically changing user-specific security policies within a distributed firewall, according to an embodiment. Method 500 occurs after completion of method 300 of FIG. 3. Method 500 may occur in parallel with method 400 of FIG. 4. One advantage of a distributed firewall implemented within filter driver 202 of VM 120 is that security policies within policy store 124 may be updated at any time, and these updates may then be broadcast to all hosts in data center 100. Updates can be enforced in real time, as discussed with reference to method 500.

At step 522 of method 500, a security policy within policy store 124 is updated. The security policy may be updated manually by an administrator of data center 100, or the security policy may be updated automatically by a component of data center 100 configured to periodically evaluate status of data center 100 and change security policies based on the evaluation. Security policies of policy store 124 may be updated through controller 170.

At step 524, controller 170 broadcasts updates to security policies that are within policy store 124 to all VMs 120 and/or all hosts 105 within data center 100. In an embodiment, controller 170 contains information on what users 102 have been assigned to which VMs 120 within hosts 105, and controller 170 broadcasts the security policy updates only to those VMs 120 that are hosting users 102 whose policies have been updated. Steps 525 through 532 of method 500 apply to a single VM 120.

At step 526, VM 120 receives security policy updates. Filter driver 202 intercepts the network packets containing updates and evaluates the updates with regards to whether the updates pertain to any user session 208 that is currently running within VM 120.

At step 528, filter driver 202 determines whether the security policy updates affect any user session 208 running within VM 120. If not, then at step 530, filter driver 202 ignores the received security policy updates. If the received security policy updates affect any user session 208, then at step 532, filter driver 202 updates data structure 210 as necessary, mapping the new security policies to the ID(s) of user session(s) 208. For example, if the security policy updates updated the security policy of user session $208_1$, then filter driver 202 updates data structure 210 so that that ID of user session $208_1$ maps to the updated security policy of user session $208_1$.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of filtering network packets, the method comprising:
   creating a first user session and a second user session;
   obtaining, from a filtering platform service of an operating system of a virtual machine, an identifier (ID) for the first user session or the second user session, wherein the ID is assigned within a kernel space of the operating system and assigned to refer to a session of a user within the operating system of the virtual machine;
   setting a first security policy pertaining to the first user session, and setting a second security policy pertaining to the second user session, wherein the first user session or the second user session comprises the session of the user associated with the ID, wherein the first security policy or the second security policy define per-user access privileges, the per-user access privileges including a limitation specifying that the user is limited from accessing at least one of a file or a server;
   receiving a network packet, by a filter driver, the network packet (a) originating from the first user session or destined for the first user session or (b) originating from the second user session or destined for the second user session, wherein the filter driver is located within the kernel space of the virtual machine;
   in an instance in which the network packet originated from the first user session or is destined for the first user session, comparing packet attributes of the network packet to the first security policy;
   in an instance in which the network packet originated from the second user session or is destined for the second user session, comparing packet attributes of the network packet to the second security policy; and
   in an instance in which packet attributes of the network packet are compared to the first security policy or the second security policy, either blocking the network packet or transmitting the network packet.

2. The method of claim 1, wherein the filter driver is configured to intercept network packets generated by the first user session and the second user session.

3. The method of claim 1, further comprising:
   receiving a security update;
   determining whether the security update applies to the first user session, the second user session, or neither; and
   in an instance in which the security update applies to the first user session or the second user session, updating the data structure.

4. The method of claim 1, wherein a first copy of the first security policy is stored within a central storage repository and a second copy of the first security policy is stored within memory of the virtual machine.

5. The method of claim 1, wherein a container object operates in conjunction with the first user session or the second user session.

6. The method of claim 1, wherein the filtering platform service comprises an application layer enforcement feature and the filter driver uses the application layer enforcement feature.

7. The method of claim 1, wherein the setting the first security policy pertaining to the first user session comprises mapping, within a data structure, the first security policy to the ID of the first user session, and wherein the setting the second security policy pertaining to the second user session comprises mapping, within the data structure, the second security policy to the ID of the second user session.

8. A non-transitory computer readable medium comprising instructions to be executed in a processor of a computer system, wherein the instructions when executed in the processor cause the computer system to carry out a method of filtering network packets, said method comprising:
   creating a first user session and a second user session;
   obtaining, from a filtering platform service of an operating system of a virtual machine, an identifier (ID) for the first user session or the second user session, wherein the ID is assigned within a kernel space of the operating system and assigned to refer to a session of a user within the operating system of the virtual machine;
   setting a first security policy pertaining to the first user session, and setting a second security policy pertaining to the second user session, wherein the first user session or the second user session comprises the session of the user associated with the ID, wherein the first security policy or the second security policy define per-user access privileges, the per-user access privileges including a limitation specifying that the user is limited from accessing at least one of a file or a server;
   receiving a network packet, by a filter driver, the network packet (a) originating from the first user session or destined for the first user session or (b) originating from the second user session or destined for the second user session, wherein the filter driver is located within the kernel space of the virtual machine;
   in an instance in which the network packet originated from the first user session or is destined for the first user session, comparing packet attributes of the network packet to the first security policy;
   in an instance in which the network packet originated from the second user session or is destined for the second user session, comparing packet attributes of the network packet to the second security policy; and
   in an instance in which packet attributes of the network packet are compared to the first security policy or the second security policy, either blocking the network packet or transmitting the network packet.

9. The non-transitory computer readable medium of claim 8, wherein the filter driver is configured to intercept network packets generated by the first user session and the second user session.

10. The non-transitory computer readable medium of claim 8, further comprising:
    receiving a security update;
    determining whether the security update applies to the first user session, the second user session, or neither; and
    in an instance in which the security update applies to the first user session or the second user session, updating the data structure.

11. The non-transitory computer readable medium of claim 8, wherein the data structure contains a mapping of a second ID of the second user session to the second security policy.

12. The non-transitory computer readable medium of claim 8, wherein a first copy of the first security policy is stored within a central storage repository and a second copy of the first security policy is stored within memory of the virtual machine.

13. The non-transitory computer readable medium of claim 8, wherein a container object operates in conjunction with the first user session or the second user session.

14. The non-transitory computer readable medium 8, wherein the setting the first security policy pertaining to the first user session comprises mapping, within a data structure, the first security policy to the ID of the first user session, and wherein the setting the second security policy pertaining to the second user session comprises mapping, within the data structure, the second security policy to the ID of the second user session.

15. A computer system comprising:
a host machine, a virtual machine running on the host machine, the virtual machine comprising a filter driver, the host machine comprising a processor and system memory, wherein the system memory stores executable instructions, which when executed by the processor cause the host machine to:
create a first user session and a second user session;
obtain, from a filtering platform service of an operating system of the virtual machine, an identifier (ID) for the first user session or the second user session, wherein the ID is assigned within a kernel space of the operating system and assigned to refer to a session of a user within the operating system of the virtual machine;
set a first security policy pertaining to the first user session, and set a second security policy pertaining to the second user session, wherein the first user session or the second user session comprises the session of the user associated with the ID, wherein the first security policy or the second security policy define per-user access privileges, the per-user access privileges including a limitation specifying that the user is limited from accessing at least one of a file or a server;
receive a network packet, by the filter driver, the network packet (a) originating from the first user session or destined for the first user session or (b) originating from the second user session or destined for the second user session, wherein the filter driver is located within the kernel space of the virtual machine;
in an instance in which the network packet originated from the first user session or is destined for the first user session, compare packet attributes of the network packet to the first security policy;
in an instance in which the network packet originated from the second user session or is destined for the second user session, compare packet attributes of the network packet to the second security policy; and
in an instance in which packet attributes of the network packet are compared to the first security policy or the second security policy, either block the network packet or transmit the network packet.

16. The computer system of claim 15, wherein the filter driver is configured to intercept network packets generated by the first user session and the second user session.

17. The computer system of claim 15, wherein set the first security policy pertaining to the first user session comprises:
map, within a data structure, the first security policy to the ID of the first user session, and
wherein set the second security policy pertaining to the second user session comprises:
map, within the data structure, the second security policy to the ID of the second user session.

18. The computer system of claim 17, wherein the executable instructions, when executed, further cause the host machine to:
receive a security update;
determine whether the security update applies to the first user session, the second user session, or neither; and
in an instance in which the security update applies to the first user session or the second user session, update the data structure.

19. The computer system of claim 17, wherein the data structure contains a mapping of a second ID of the second user session to the second security policy.

20. The computer system of claim 15, wherein a first copy of the first security policy is stored within a central storage repository and a second copy of the first security policy is stored within memory of the virtual machine.

21. The computer system of claim 15, wherein the setting the first security policy pertaining to the first user session comprises mapping, within a data structure, the first security policy to the ID of the first user session, and wherein the setting the second security policy pertaining to the second user session comprises mapping, within the data structure, the second security policy to the ID of the second user session.

* * * * *